United States Patent
Chen et al.

(10) Patent No.: US 7,052,183 B2
(45) Date of Patent: May 30, 2006

(54) COMPOSITE RESILIENT MOUNT

(75) Inventors: Robert P. Chen, Torrance, CA (US); Sam Shiao, Cerritos, CA (US)

(73) Assignee: Honeywell International Inc., Morristown, NJ (US)

( * ) Notice: Subject to any disclaimer, the term of this patent is extended or adjusted under 35 U.S.C. 154(b) by 99 days.

(21) Appl. No.: 10/869,804

(22) Filed: Jun. 15, 2004

(65) Prior Publication Data

US 2005/0276530 A1 Dec. 15, 2005

(51) Int. Cl.
*F16C 19/06* (2006.01)
(52) U.S. Cl. .................. 384/536; 267/141.3
(58) Field of Classification Search ........ 384/536, 384/538, 220, 221, 222; 267/141.3

See application file for complete search history.

(56) References Cited

U.S. PATENT DOCUMENTS

| | | |
|---|---|---|
| 5,044,784 A | 9/1991 | Lisowsky |
| 5,564,903 A | 10/1996 | Eccles et al. |
| 6,536,953 B1 | 3/2003 | Cope et al. |
| 6,540,407 B1 | 4/2003 | Van Dine et al. |
| 6,682,219 B1 | 1/2004 | Alam et al. |

*Primary Examiner*—Lenard A. Footland
(74) *Attorney, Agent, or Firm*—Oral Caglar, Esq.

(57) ABSTRACT

A composite resilient mount for rolling element bearings, comprising a composite hoop portion, and including a plurality of circumferentially dispersed inner pads and outer pads defining a plurality of arcuate beam portions disposed circumferentially between adjacent pads. The hoop portion and the inner and outer pads, may comprise a circumferentially wound fiber, such as a carbon fiber, and a resin. The inner and outer pads may be rounded, feathered or otherwise configured to eliminate edges from the inner and outer pads, thereby preventing damage to adjacent components. A method for providing damping to a rolling element bearing is also disclosed.

35 Claims, 6 Drawing Sheets

US 7,052,183 B2

COMPOSITE RESILIENT MOUNT

BACKGROUND OF THE INVENTION

The present invention generally relates to a bearing mount, and in particular to a composite resilient mount for rolling element bearings.

Rotating machinery is subject to vibration during operation at various speeds. Such vibration may be due to: (1) approaching and/or traversing rotor critical speeds or (2) misalignment between the rotor itself and one or more bearings for the rotor. Machinery operated at high rotational speeds, for example, at speeds greater than 30,000 rpm, is particularly prone to both types of vibration. Vibration of the rotor and other rotating parts increases the radial load on the bearings and may lead to premature failure of the bearings.

Attempts to decrease vibrations in high speed rotors have included the use of resilient mounts arranged external to the outer raceway of the bearing. As an example, U.S. Pat. No. 5,564,903 to Eccles et al. discloses a ram air turbine power system, including a bearing mount ring disposed between a thrust liner and a bearing carrier, wherein the mount ring includes a first set of radially outwardly extending pads, a second set of radially inwardly extending pads, and flexible beams between the radially outwardly extending pads radially inwardly extending pads. The mount ring of Eccles et al. may further include axial pads extending axially at opposite ends of the mount ring, wherein the axial pads respectively engage thrust shoulders on the housing and on the bearing race.

U.S. Pat. No. 5,044,784 to Lisowsky discloses a bearing isolator for absorbing vibration and acoustic energy, wherein the bearing isolator comprises an inner spoked metal ring for registration with the outer raceway, an outer spoked metal ring for attachment to a mounting structure, and an annular member disposed between the inner metal ring and the outer metal ring. The annular member may comprise a resinous material, such as polyimide or epoxy, and a minor fractional fill of graphite, glass particles, or glass fibers.

U.S. Pat. No. 6,540,407 to Van Dine et al. discloses a rolling element bearing arrangement comprising an inner race facing in one lateral direction, and an outer race facing in a second, opposite lateral direction. A vibration inhibiting outer ring member, which may comprise a heavy metal or a resilient material, is disposed against the outer surface of the outer race. The vibration inhibiting outer ring member may be retained against the outer race by a composite wrap.

Although prior art mounts may decrease vibration of rotating machinery, nevertheless, vibration remains a potential problem at certain speeds. For example, the vibration inhibiting outer ring member of the '407, even when combined with the composite wrap, is unlikely to provide sufficient damping or stiffness to a bearing to prevent vibration of a high speed rotor. In addition, the heavy metal construction of the vibration inhibiting outer ring member adds excessive weight to the machinery, which is of particular concern in aerospace applications.

As can be seen, there is a need for a single-component, resilient mount for rolling element bearings that provides radial damping to prevent vibration of high speed rotating machinery. There is a further need for a resilient mount that is light in weight, and which will not damage bearing housings or other components of rotating machinery.

SUMMARY OF THE INVENTION

In one aspect of the present invention, there is provided a mount comprising a hoop portion having a hoop external surface and a hoop internal surface; a plurality of inner pads dispersed circumferentially on the hoop internal surface; and a plurality of outer pads dispersed circumferentially on the hoop external surface, wherein each of the inner pads and outer pads include peripheral pad rounded portions, and the mount comprises a composite material, wherein the composite material includes fibers.

In another aspect of the present invention, a mount for a bearing comprises a hoop portion having a hoop external surface and a hoop internal surface; a plurality of inner pads dispersed circumferentially on the hoop internal surface; and a plurality of outer pads dispersed circumferentially on the hoop external surface, wherein the mount comprises a composite material comprising circumferentially wound fibers impregnated with a resin.

In still another aspect of the present invention, there is provided a composite resilient mount including a hoop portion comprising at least one layer of circumferentially wound fibers impregnated with a resin, the hoop portion having a hoop internal surface and a hoop external surface; a plurality of inner pads disposed on the hoop internal surface; and a plurality of outer pads disposed on the hoop external surface, wherein the total number of inner pads equals the total number of outer pads, each of the outer pads is interspersed between an adjacent pair of the inner pads to define a plurality of arcuate beam portions circumferentially disposed between the inner pads and the outer pads, and each of the inner pads and outer pads include peripheral pad rounded portions.

In yet another aspect of the present invention, a bearing assembly comprises an inner raceway; an outer raceway disposed radially outward from the inner raceway, the outer raceway having an outer raceway outer surface; a composite resilient mount disposed radially outward from the outer raceway; and a housing having a housing inner surface, the outer raceway outer surface and the housing inner surface jointly defining an annular space, wherein the composite resilient mount is disposed within the annular space. The composite resilient mount may comprise a hoop portion having a hoop internal surface and a hoop external surface, a plurality of inner pads dispersed circumferentially on the hoop internal surface, and a plurality of outer pads dispersed circumferentially on the hoop external surface, wherein the composite resilient mount comprises a composite material comprising circumferentially wound fibers impregnated with a resin.

In an additional aspect of the present invention, there is provided an apparatus comprising a rotor; a rolling element bearing for supporting the rotor, the bearing comprising an outer raceway; a housing for the bearing; and a composite resilient mount disposed external to the outer raceway. The composite resilient mount may comprises a hoop portion having a hoop internal surface and a hoop external surface, a plurality of inner pads dispersed circumferentially on the hoop internal surface, and a plurality of outer pads dispersed circumferentially on the hoop external surface, wherein the composite resilient mount comprises a composite material, and the composite material comprises circumferentially wound fibers and a resin.

In a further aspect of the present invention, there is provided a method for providing damping to a bearing, the method comprising providing a composite resilient mount; and disposing the composite resilient mount external to an outer raceway of the bearing, wherein the composite resilient mount comprises a hoop portion having a hoop internal surface and a hoop external surface, a plurality of inner pads dispersed circumferentially on the hoop internal surface, and a plurality of outer pads dispersed circumferentially on the hoop external surface, wherein the total number of inner pads equals the total number of outer pads, each of the outer pads is interspersed between an adjacent pair of the inner pads to define a plurality of arcuate beam portions, the beam portions circumferentially disposed between the outer pads and the inner pads, and the composite resilient mount comprises circumferentially wound fibers impregnated with a resin.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a composite resilient mount for rolling element bearings. The composite resilient mount of the instant invention may find applications in high speed rotating machinery, and in particular in machinery operating at speeds of about 30,000 rpm or higher, where shaft or rotor vibration has the potential to cause premature failure of bearings or other components, for example, as a result of traversing rigid-body critical speeds. As an example, the composite resilient mount of the present invention may be used for generators, compressors, motors and the like, as well as turbomachines for electric power generation and gas turbine engines for aircraft or other vehicles. Thus, the instant invention may find applications in various industries, including aerospace, the power generation industry, and transportation.

Unlike prior art bearing mounts, the present invention provides a composite resilient mount in the form of a single annular component or element comprising a composite material, wherein the annular element may include a plurality of circumferentially dispersed outer pads and a plurality of inner pads. The annular member, including the inner and outer pads, may comprise a continuously wound fiber material, such as a carbon fiber, and a resin. Each of the inner and outer pads may be rounded, feathered or otherwise configured to eliminate edges from the pads which might otherwise damage, e.g., gouge, adjacent components. In contrast to the instant invention, prior art bearing mounts are multi-component devices which include metal components, or single component metal devices, wherein the metal components may be in direct contact with, and cause damage to, bearing components and housing components. Composite resilient mounts of the instant invention may also be lighter and provide a greater range of stiffness and more damping, as compared with a metal mount of the same size.

Figure 1:
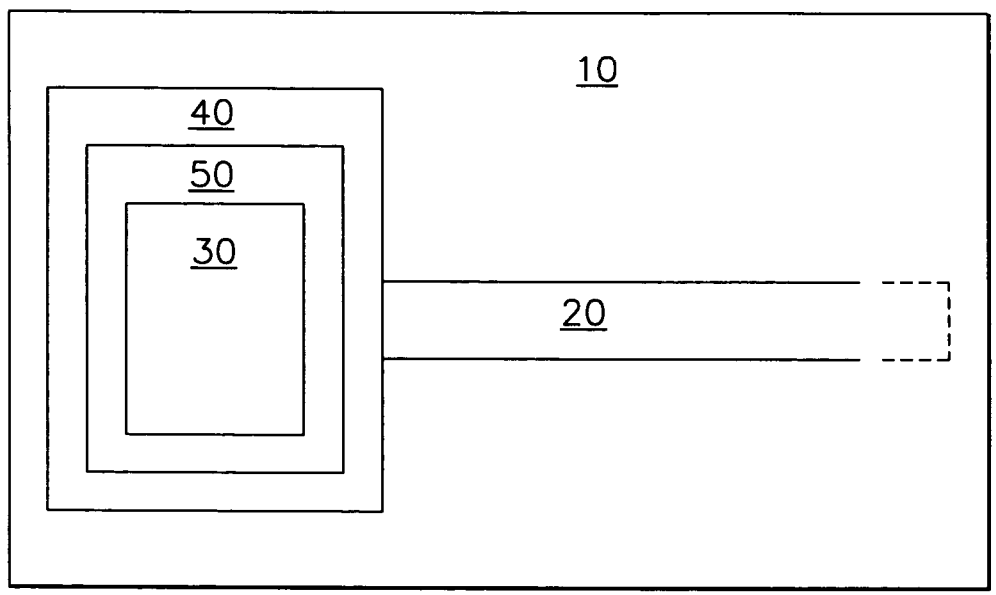
FIG. 1 is a block diagram schematically representing rotating machinery, according to one embodiment of the invention.

FIG. 1 is a block diagram representing rotating machinery or apparatus 10, according to one embodiment of the invention. Rotating machinery 10 may include a shaft or rotor 20, which may be supported by a bearing 30. In practice, rotating machinery 10 may typically include at least a second bearing for supporting rotor 20; however, for the sake of clarity only one bearing is shown in FIG. 1. Bearing 30 may be housed within a housing 40. A composite resilient mount 50 may be disposed external to bearing 30 and internal to housing 40. An inner surface of housing 40 may define an annular space external to an outer raceway of bearing 30 (see FIG. 2B), wherein the annular space may accommodate composite resilient mount 50. Rotating machinery 10 may comprise, for example, apparatus such as a generator, a compressor, a motor, or a turbomachine. During operation of such apparatus, rotor 20 may rotate at speeds typically up to about 100,000 rpm, and often in the range of from about 30,000 to 100,000 rpm.

Figure 2A:
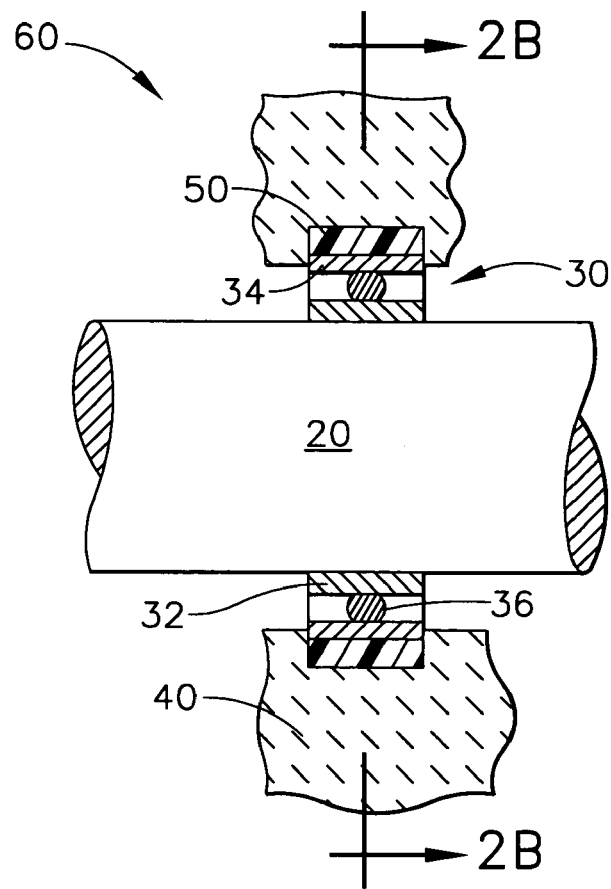
FIG. 2A is a partial sectional view of a bearing assembly including a rolling element bearing having an external composite resilient mount, according to the invention.
Figure 2B:
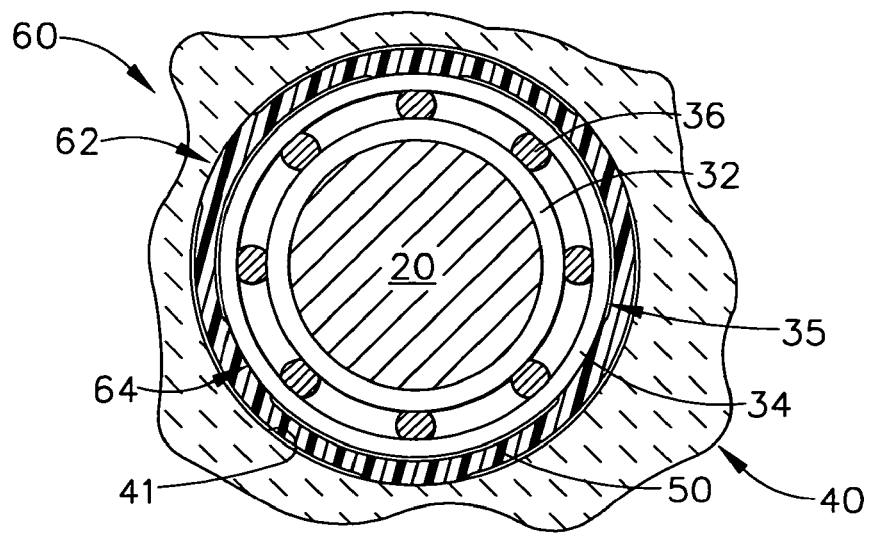
FIG. 2B is an axial view taken along the line 2B—2B of FIG. 2A.

With reference to FIGS. 2A and 2B, there is shown a bearing assembly 60 which may be used in conjunction with rotating machinery 10. Bearing assembly 60 may include rolling element bearing 30. Rolling element bearing 30 may include an inner raceway 32, an outer raceway 34, and a plurality of rolling elements 36 retained between inner raceway 32 and outer raceway 34. (The separator or cage for rolling elements 36 is not shown for the sake of clarity.) Inner raceway 32 may be affixed to rotor 20 for rotation therewith. Rolling elements 36 may be ball bearings or rollers, as is well known in the art.

With reference to FIG. 2B, outer raceway 34 may have an outer raceway outer surface 35, while housing 40 may have a housing inner surface 41. Housing inner surface 41 and outer raceway outer surface 35 may jointly define an annular space for accommodating composite resilient mount 50. Composite resilient mount 50 may provide damping and stiffness to rolling element bearing 30. Composite resilient mount 50 may comprise a circumferentially wound fiber embedded in a resin, as will be described fully hereinbelow.

Figure 3C:
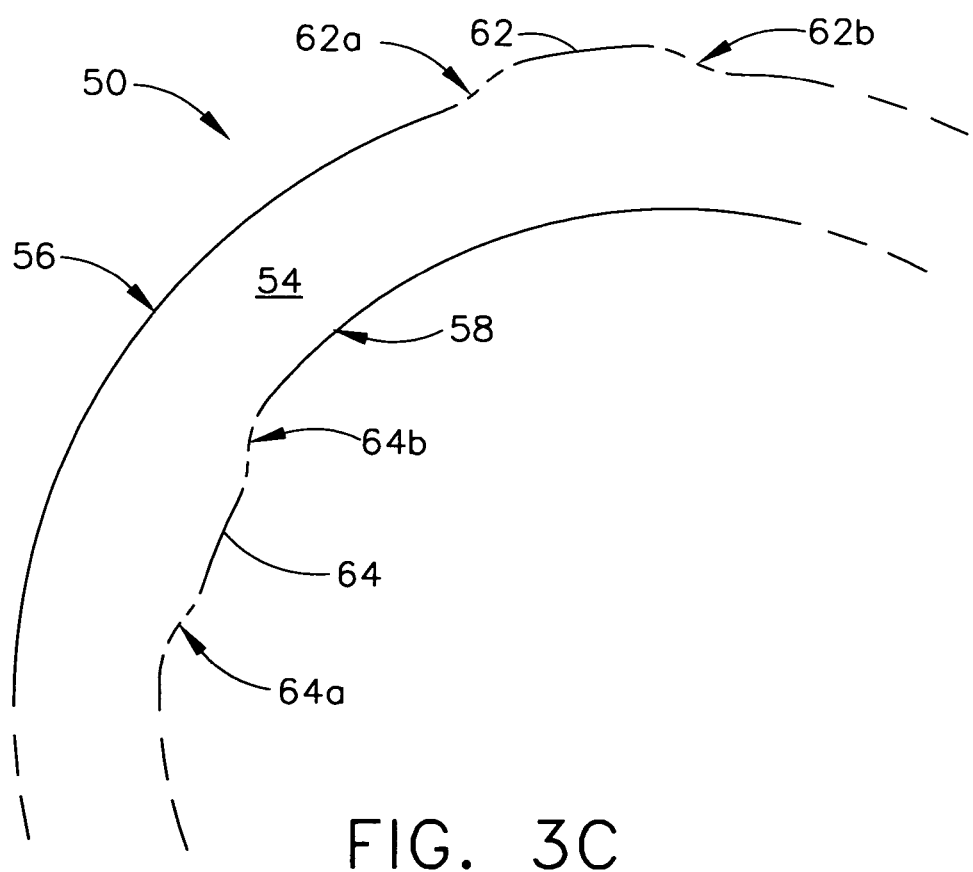
FIG. 3C is an enlarged axial view of a portion of a composite resilient mount showing the rounded portions of both an inner pad and an outer pad, according to another aspect of the invention.
Figure 3A:
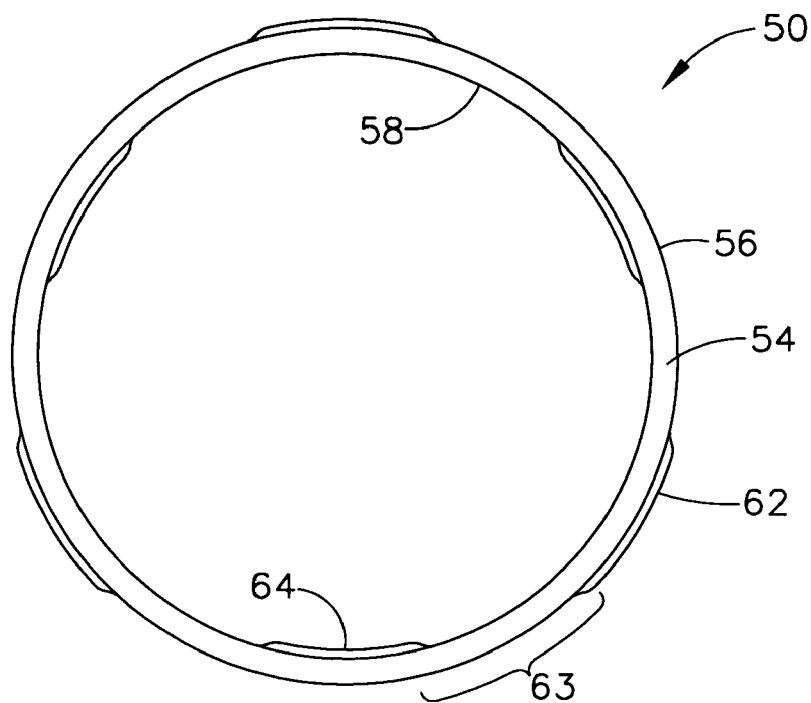
FIG. 3A is an axial view of a composite resilient mount, according to one embodiment of the invention.

FIG. 3A is an axial view of a composite resilient mount 50, according to the invention. Composite resilient mount 50 may comprise an annular member including a body or hoop portion 54, having a hoop external surface 56 and a hoop internal surface 58. Hoop portion 54 may comprise at least one layer of circumferentially wound fibers impregnated with a resin. Composite resilient mount 50 may further comprise a plurality of outer pads 62 extending radially outward from hoop external surface 56. Outer pads 62 may be circumferentially dispersed on hoop external surface 56.

Composite resilient mount 50 may still further comprise a plurality of inner pads 64 extending radially inward from hoop internal surface 58. Inner pads 62 may be circumferentially dispersed on hoop internal surface 58. Outer pads 64 may be evenly dispersed circumferentially on hoop external surface 56, such that the distance between each adjacent outer pad 62 is the same. Similarly, inner pads 64 may be evenly dispersed on hoop internal surface 58, such that the distance between each adjacent inner pad 64 is the same.

Each outer pad 62 may be interspersed between an adjacent pair of inner pads 64 to define a plurality of arcuate beam portions 63, circumferentially disposed between outer pads 62 and inner pads 64. Each beam portion 63 may represent an arc length of hoop portion 54 between an outer pad 62 and an adjacent inner pad 64. Each outer pad 62 may be located equidistant between an adjacent pair of inner pads 64, and each beam portion 63 may have the same length. The total number of beam portions 63 may be twice the total number of inner pads 62. Each beam portion 63 may function as a spring to provide appropriate stiffness and damping to rolling element bearing 30.

The total number of inner pads 64 may be equal to the total number of outer pads 62. The total number of inner pads 64 and of outer pads 62 may be a matter of design choice. In the embodiment shown in FIG. 3A, the total number of inner pads 64 may be three (3), and the total number of outer pads 64 may also be three (3). However, composite resilient mounts 50 having other numbers of outer pads and inner pads 62, 64, and consequently other numbers of beam portions 63, are also within the scope of the invention.

Figure 3B:
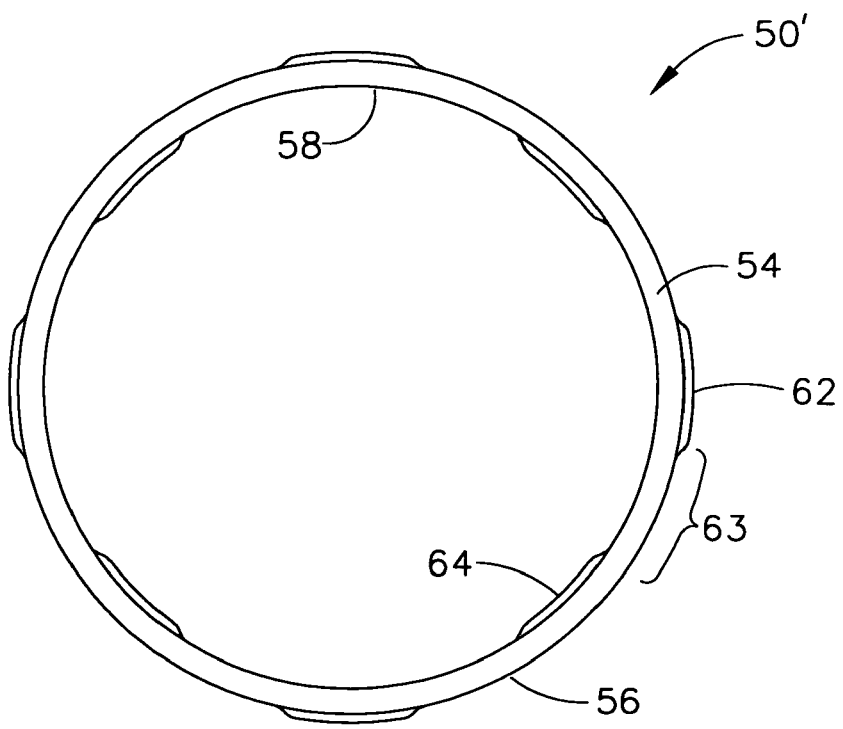
FIG. 3B is an axial view of a composite resilient mount, according to another embodiment of the invention.

FIG. 3B is an axial view of a composite resilient mount 50', according to another embodiment of the invention. Composite resilient mount 50' may have the same, similar or analogous elements, features and characteristics as described hereinabove for composite resilient mount 50 with reference to FIG. 3A. However, composite resilient mount 50' may differ from composite resilient mount 50 in having a total of four (4) outer pads 64, four (4) inner pads 62, and eight (8) beam portions 63.

FIG. 3C is an enlarged axial view of a portion of a composite resilient mount 50 including an outer pad 62 and an inner pad 64. According to one aspect of the present invention, outer pad 62 may include first and second outer pad rounded portions, 62a, 62b such that peripheral parts of outer pad 62 may be rounded or feathered to hoop external surface 56. Configuration of outer pads 62 to include first and second outer pad rounded portions, 62a, 62b may eliminate edges from the exterior surfaces of composite resilient mount 50, which might otherwise damage adjacent components, such as a housing inner surface 41, of bearing assembly 60.

Similarly, and again with reference to FIG. 3C, inner pad 64 may include first and second inner pad rounded portions, 64a, 64b such that peripheral parts of inner pad 64 may be rounded or feathered to hoop internal surface 58. Configuration of inner pads 64 to include first and second inner pad rounded portions, 64a, 64b may eliminate edges from the interior surfaces of composite resilient mount 50, which might otherwise damage adjacent components, such as outer raceway outer surface 35, of bearing assembly 60 (see, e.g., FIG. 3B). First and second outer pad rounded portions, 62a, 62b, and first and second inner pad rounded portions, 64a, 64b are indicated in FIG. 3C by broken lines for the sake of clarity.

Figure 4A:
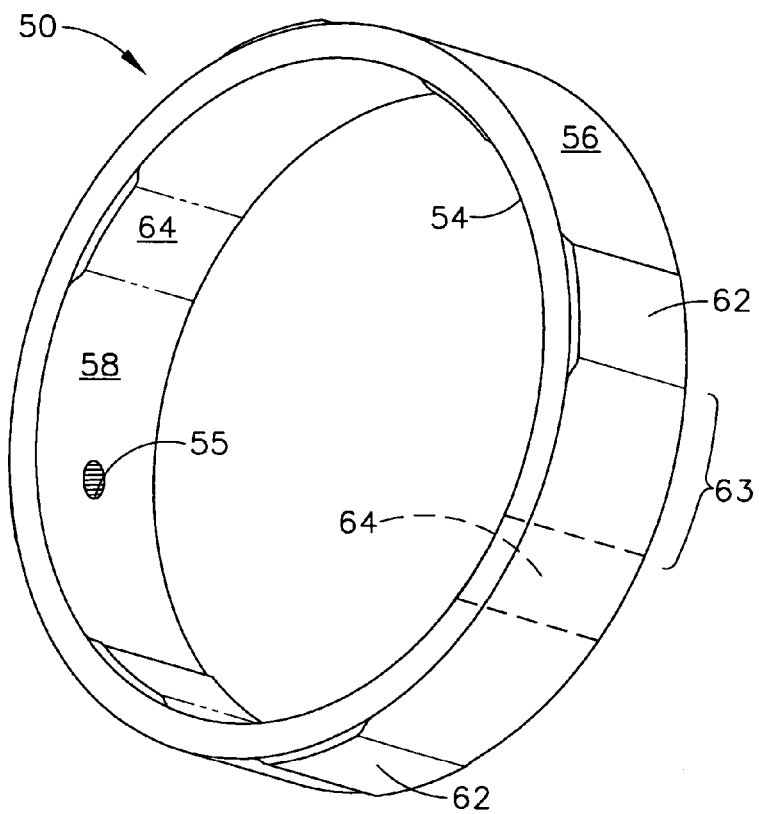
FIG. 4A is a perspective view of a composite resilient mount, according to another embodiment of the invention.

With reference to FIG. 4A, composite resilient mount 50 may further include at least one through-the-thickness retention bore 55 adapted for receiving a retaining pin (not shown), whereby composite resilient mount 50 may be retained against housing 40. The edges of retention bore 55 may be rounded. The retaining pin may comprise, as an example, a screw. Composite resilient mount 50 may also be retained by a slight interference fit between outer pads 62 and housing inner surface 41. Composite resilient mount 50 may also be retained by a slight interference fit between inner pads 64 and outer raceway outer surface 35 (see, e.g., FIG. 3B).

Figure 4B:
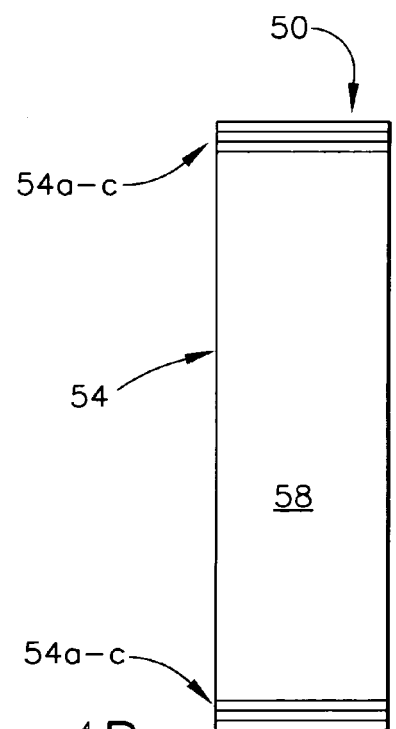
FIG. 4B is a sectional view of the composite resilient mount of FIG. 4A.

FIG. 4B is a sectional view of the composite resilient mount 50 of FIG. 4A. Hoop portion 54 may comprise a plurality of layers 54a–c. Each layer 54a–c may comprise a layer of circumferentially wound fiber embedded in a resin. A plurality of layers, e.g., layers 54a–c, of circumferentially wound fiber, such as carbon fiber, embedded in a resin may provide radial stiffness to composite resilient mount 50, which in turn may provide radial stiffness to bearing 30 disposed internal to composite resilient mount 50. The fiber may be wound by wet winding, wherein the fiber may be passed through a resin bath prior to winding; or by prepreg winding, wherein the fiber may be pre-impregnated with resin prior to winding the prepreg fiber. Wet winding and prepreg winding of filaments are known in the art.

In one embodiment, a plurality of prepreg fibers may be aligned parallel to each other in a single plane to form a prepreg tape, and each layer 54a–c may be formed from a circumferentially wound length of the prepreg tape. Prepreg tape is also generally known in the art. Although three mount layers 54a–c are shown in FIG. 4B, other numbers of layers are within the scope of the invention. Various elements of composite resilient mount 50 are omitted from FIG. 4B for the sake of clarity.

Figure 5A:
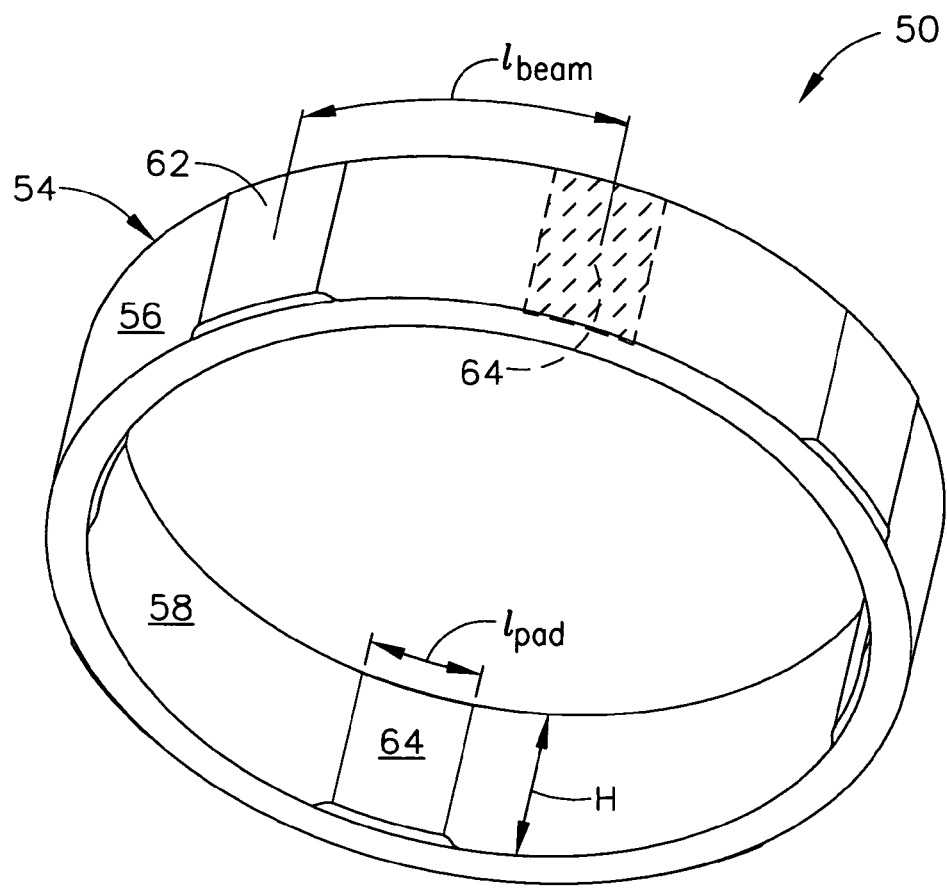
FIG. 5A is a perspective view of a composite resilient mount indicating the dimensions of elements thereof, according to another embodiment of the invention.

FIG. 5A is a perspective view of composite resilient mount 50 indicating the height, H of hoop portion 54. Typically, height, H may also represent the height of outer pads 62 and of inner pads 64. The pad length, $l_{pad}$ of outer pads 62 and of inner pads 64 may be the same. Thus, the distance $l_{pad}$ may represent the length of outer pads 62 or the length of inner pads 64. The ratio of height, H to pad length, $l_{pad}$ (H:$l_{pad}$) may typically be in the range of from about 1.0 to 3.0, usually from about 1.2 to 2.5, and often from about 1.2 to 2.2.

Again with reference to FIG. 5A, the distance, $l_{beam}$ may represent the distance between the centerline of an outer pad 62 to the centerline of an adjacent inner pad 64. The ratio of $l_{pad}$ to $l_{beam}$ ($l_{pad}$:$l_{beam}$) may be in the range of from about 0.25 to 0.60, typically from about 0.30 to 0.55, and often from about 0.32 to 0.54. The ratio of height, H to $l_{pad}$, as well as the ratio of $l_{pad}$ to $l_{beam}$, may be important in providing a beam effect of composite resilient mount 50 of the present invention, whereby each beam portion 63, which may comprise a circumferentially wound fiber composite, acts as a spring to provide appropriate damping to rolling element bearing 30. As an example, for a composite resilient mount 50 of the present invention having three outer pads 62 and three inner pads 64, $l_{beam}$ may represent about one sixth of the circumference of composite resilient mount 50.

Figure 5B:
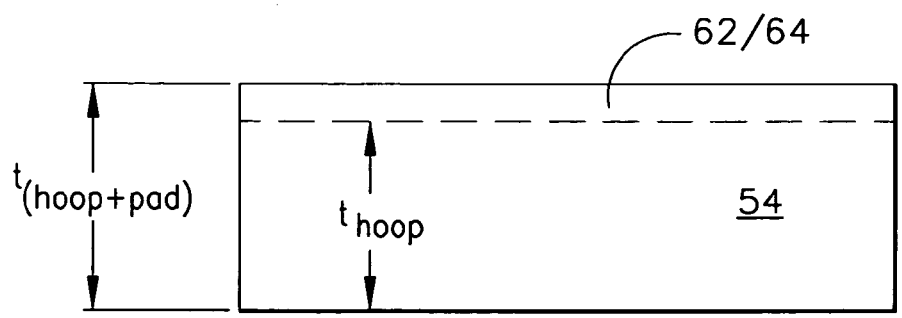
FIG. 5B shows a radial section of a composite resilient mount indicating the thickness of the pads relative to the thickness of the hoop portion, according to the invention.

FIG. 5B shows a radial section of composite resilient mount 50 indicating the thickness of the outer or inner pads 62, 64 relative to the thickness of hoop portion 54, according to the invention. The thickness of outer pads 62 may be the same as the thickness of the inner pads 64. The distance $t_{hoop}$ may represent the thickness of hoop portion 54 in the absence of a pad (outer pad 62 or inner pad 64). The distance $t_{(hoop+pad)}$ may represent the thickness of hoop portion 54 plus the thickness of a pad (outer pad 62 or inner pad 64). The ratio of $t_{(hoop+pad)}$ to $t_{hoop}$ ($t_{(hoop+pad)}:t_{hoop}$) may typically be in the range of from about 1.04 to 1.25, usually from about 1.05 to 1.20, and often from about 1.05 to 1.16. The ratio of $t_{(hoop+pad)}$ to $t_{hoop}$ may be important in providing the beam effect of composite resilient mount 50 of the present invention, whereby each beam portion 63 may function as a spring to provide appropriate damping to rolling element bearing 30.

Figure 6:
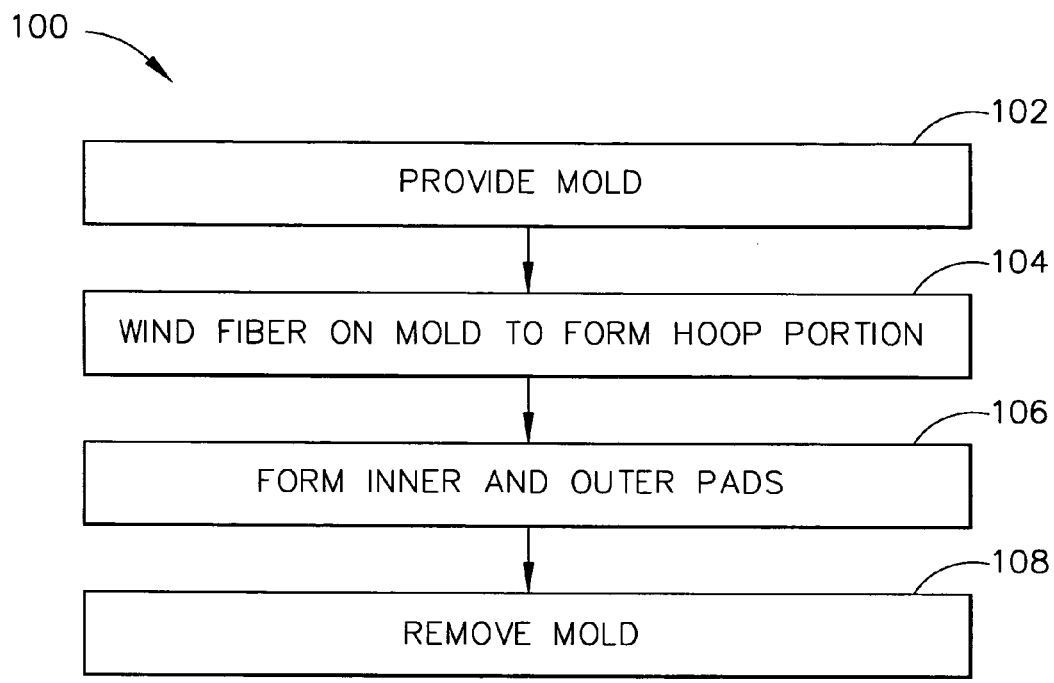
FIG. 6 is a flow chart schematically representing a series of steps involved in a method for making a composite resilient mount, according to another embodiment of the invention.

FIG. 6 is a flow chart schematically representing a series of steps involved in a method 100 for making a composite resilient mount, according to another embodiment of the invention. Step 102 may involve providing a mold for winding fiber to form the composite resilient mount. The mold may be annular and may be sized appropriately to provide the composite resilient mount of appropriate dimensions. Annular and cylindrical molds for winding fibers thereon in the fabrication of composites are generally known in the art.

In some embodiments, the mold provided in step 102 may be in the form of an annulus having radial inner and/or outer protrusions which may correspond to, or represent, incipient inner and outer pads of the composite resilient mount. Alternatively, the mold may be in the form of an annulus that lacks radial inner and/or outer protrusions.

Step 104 may involve winding fiber on the mold. The fiber may be wound circumferentially. Prior to winding, the fiber may be treated or impregnated with a resin. The fiber may be treated with resin prior to wet winding, or the fiber may be pre-impregnated with resin for prepreg winding of the fiber. In one embodiment, a plurality of prepreg fibers aligned parallel to each other, in the form of prepreg tape, may be circumferentially wound on the mould. Exemplary resins include polyimide and polyetheretherketone (PEEK). An exemplary fiber is carbon fiber as is known in the art for making C-C composite materials. Glass fiber may also be used in step 104. An exemplary fiber winding technique of step 104 is hoop winding. Hoop winding, as well as other fiber winding techniques for forming composite articles, are generally known in the art.

Step 106 may involve forming the inner and outer pads of the composite resilient mount. In embodiments where the mold includes radial inner and outer protrusions, step 106 may be accomplished concomitantly with step 104. In other embodiments where the mold lacks radial inner and/or outer protrusions, step 106 may involve, after forming the hoop portion of the composite resilient mount according to step 104, forming the inner pads and the outer pads by build-up of composite material on the hoop internal surface and on the hoop external surface, respectively. The composite material used to buildup the hoop internal and external surfaces to form the inner and outer pads, respectively, may comprise fibers impregnated with resin. The composite material used to buildup the inner and outer pads may have the same composition as that used to form the hoop portion in step 104.

In other embodiments where the mold lacks radial inner and/or outer protrusions, step 104 may involve partially forming the hoop portion of the composite resilient mount, and thereafter step 106 may involve: i) placing a form material at selected circumferential locations on the internal and external surfaces of the partially formed hoop portion, wherein the selected locations correspond to the intended locations for the inner and outer pads, and ii) circumferentially winding resin-impregnated fibers over the form material located on the internal and external surfaces of the partially formed hoop portion, thereby forming a hoop portion having radially inward extending inner pads and radially outward extending outer pads. The form material placed at selected locations on the internal and external surfaces of the partially formed hoop portion may comprise one or more layers of material, such as a metal or an organic polymer or plastic material, having a suitable thickness appropriate to the desired thickness of the inner and outer pads. A layer of metal used as a form material in step 106 may comprise a metal, such as titanium or stainless steel, compatible with the resin-impregnated fiber used to form the composite resilient mount. Step 108 may involve removing the mold provided in step 102 to provide the composite resilient mount comprising resin-impregnated fiber.

In alternative embodiments, step 102 may involve providing a pseudo-mold in the form of an annular metal core comprising a metal which is compatible with the composite material or resin-impregnated fiber to be wound in step 104. For example, the metal core or pseudo-mold may comprise a metal, such as titanium or stainless steel, which is compatible with C—C composite materials. Fiber, such as carbon fiber, may be circumferentially wound on both the internal and external surfaces of such a metal core to form a composite resilient mount having a metal core sandwiched between two or more layers of composite material. The metal core may include incipient inner and outer pads in the form of radial protrusions disposed on the internal and external surfaces of the metal core, analogous to radial protrusions described hereinabove for a removable mold. Alternatively, the metal core may lack such protrusions, and the inner and outer pads may be formed essentially as described hereinabove for step 106.

Figure 7:
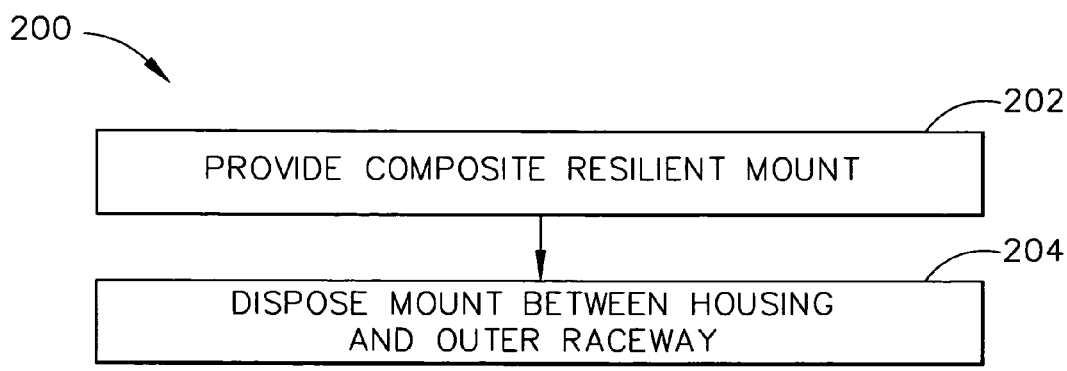
FIG. 7 is a flow chart schematically representing steps involved in a method for providing damping to a rolling element bearing via an external composite resilient mount, according to another embodiment of the invention.

FIG. 7 schematically represents steps involved in a method 200 for providing damping to a rolling element bearing via an externally disposed composite resilient mount, according to another embodiment of the invention. Step 202 may involve providing the composite resilient mount. As an example, the composite resilient mount provided in step 202 may be prepared according to method 100 (FIG. 6). The composite resilient mount provided in step 202 may have those elements, features and characteristics as described hereinabove for composite resilient mount 50, for example, with reference to FIGS. 2A–5B. In particular, the composite resilient mount may include a plurality of circumferentially dispersed outer pads and a corresponding plurality of circumferentially dispersed inner pads, wherein each inner pad is interspersed between a pair of adjacent outer pads to define a plurality of circumferential beam portions, and wherein each beam portion is disposed between an inner pad and an adjacent outer pad. Each beam portion may act as a spring to provide damping to the bearing during rotation of the rotor at various speeds.

The composite resilient mount may be sized, and may have a composition, so as to provide sufficient damping and stiffness to a particular rolling element bearing for supporting a rotor of a particular apparatus or rotating machinery.

The composite resilient mount provided in step 202 may be especially suited for providing radial damping and radial stiffness to the bearing.

Step 204 may involve disposing the composite resilient mount between an outer raceway of the bearing and a housing for the bearing. Step 204 may involve disposing the composite resilient mount external to an outer surface of the outer raceway such that the inner pads of the composite resilient mount make contact with the outer surface of the outer raceway. The housing may have an inner surface, such that the housing inner surface and the outer raceway outer surface jointly define an annular space external to the outer raceway. Step 204 may involve disposing the composite resilient mount within the annular space such that the outer pads of the composite resilient mount contact the inner surface of the housing.

Step 204 may involve disposing the composite resilient mount between the outer raceway and the housing such that the composite resilient mount has an interference fit with both the housing inner surface and the outer raceway outer surface. Step 204 may further involve affixing the composite resilient mount to the housing via one or more retaining pins. As an example, the composite resilient mount may be affixed to the housing via a screw.

It should be understood, of course, that the foregoing relates to exemplary embodiments of the invention and that modifications may be made without departing from the spirit and scope of the invention as set forth in the following claims.

We claim:

1. A mount, comprising:
   a hoop portion having a hoop external surface and a hoop internal surface;
   a plurality of inner pads dispersed circumferentially on said hoop internal surface; and
   a plurality of outer pads dispersed circumferentially on said hoop external surface, wherein:
   each of said inner pads and said outer pads include peripheral pad rounded portions, and
   said mount comprises a composite material, wherein said composite material includes fibers.

2. The mount of claim 1, wherein the total number of said inner pads equals the total number of said outer pads, each of said outer pads is interspersed between an adjacent pair of said inner pads to define a plurality of arcuate beam portions circumferentially disposed between said outer pads and said inner pads, wherein the total number of said beam portions is twice the total number of said inner pads.

3. The mount of claim 2, wherein:
   said inner pads are evenly dispersed circumferentially on said hoop internal surface,
   said outer pads are evenly dispersed circumferentially on said hoop external surface, and
   each of said outer pads is equidistant from an adjacent pair of said inner pads.

4. The mount of claim 2, wherein each of said beam portions functions as a spring for providing damping to a bearing.

5. The mount of claim 2, wherein the total number of said inner pads is three or four.

6. The mount of claim 1, wherein said mount has a height, H to pad length, $l_{pad}$ ratio (H:$l_{pad}$) in the range of from about 1.2 to 2.2.

7. The mount of claim 1, wherein said mount has a $l_{pad}$ to $l_{beam}$ ratio ($l_{pad}$:$l_{beam}$) in the range of from about 0.30 to 0.55.

8. The mount of claim 1, wherein said mount has a $t_{(hoop+pad)}$ to $t_{hoop}$ ratio ($t_{(hoop+pad)}$:$t_{hoop}$) in the range of from about 1.05 to 1.20.

9. The mount of claim 1, wherein said composite material comprises a carbon-carbon composite material.

10. The mount of claim 1, wherein said composite material comprises a resin and said fibers are disposed circumferentially.

11. The mount of claim 10, wherein said resin comprises a polyimide or polyetheretherketone.

12. The mount of claim 10, wherein said fiber comprise glass fiber or carbon fiber.

13. A mount for a bearing, comprising:
   a hoop portion having a hoop external surface and a hoop internal surface;
   a plurality of inner pads dispersed circumferentially on said hoop internal surface; and
   a plurality of outer pads dispersed circumferentially on said hoop external surface, wherein said mount comprises a composite material comprising circumferentially wound fibers impregnated with a resin.

14. The mount of claim 13, wherein:
   the total number of said inner pads equals the total number of said outer pads,
   each of said outer pads is interspersed between an adjacent pair of said inner pads to define a plurality of arcuate beam portions,
   said beam portions circumferentially disposed between said outer pads and said inner pads,
   said outer pads are evenly dispersed circumferentially on said hoop external surface, and
   each of said outer pads is equidistant from an adjacent pair of said inner pads.

15. The mount of claim 13, wherein each of said inner pads and said outer pads include peripheral pad rounded portions.

16. The mount of claim 13, wherein said hoop internal surface and said hoop external surface each comprise a layer of said circumferentially wound fibers impregnated with said resin.

17. The mount of claim 13, wherein said composite material comprises a carbon-carbon composite material.

18. The mount of claim 17, wherein said resin comprises polyimide.

19. The mount of claim 13, wherein said composite material comprises a plurality of layers of circumferentially wound prepreg tape.

20. A composite resilient mount, comprising,
   a hoop portion comprising at least one layer of circumferentially wound fibers impregnated with a resin, said hoop portion having a hoop internal surface and a hoop external surface;
   a plurality of inner pads disposed on said hoop internal surface; and
   a plurality of outer pads disposed on said hoop external surface, wherein:
   the total number of said inner pads equals the total number of said outer pads,
   each of said outer pads is interspersed between an adjacent pair of said inner pads to define a plurality of arcuate beam portions circumferentially disposed between said inner pads and said outer pads, and
   each of said inner pads and said outer pads include peripheral pad rounded portions.

21. The composite resilient mount of claim 20, wherein:
said composite resilient mount has a height, H to pad length, $l_{pad}$ ratio (H:$l_{pad}$) in the range of from about 1.0 to 3.0,
said composite resilient mount has a $l_{pad}$ to $l_{beam}$ ratio ($l_{pad}$:$l_{beam}$) in the range of from about 0.25 to 0.60, and
said composite resilient mount has a $t_{(hoop+pad)}$ to $t_{hoop}$ ratio ($t_{(hoop+pad)}$:$t_{hoop}$) in the range of from about 1.04 to 1.25.

22. The composite resilient mount of claim 20, wherein:
the total number of said inner pads equals three (3) or four (4),
said fibers comprise carbon fibers, and
said resin comprises polyimide or polyetheretherketone.

23. A bearing assembly, comprising:
an inner raceway;
an outer raceway disposed radially outward from said inner raceway, said outer raceway having an outer raceway outer surface;
a composite resilient mount disposed radially outward from said outer raceway; and
a housing having a housing inner surface, said outer raceway outer surface and said housing inner surface jointly defining an annular space, wherein said composite resilient mount is disposed within said annular space, and said composite resilient mount comprises:
a hoop portion having a hoop internal surface and a hoop external surface,
a plurality of inner pads dispersed circumferentially on said hoop internal surface of said composite resilient mount, and
a plurality of outer pads dispersed circumferentially on said hoop external surface of said composite resilient mount,
wherein said composite resilient mount comprises a composite material comprising circumferentially wound fibers impregnated with a resin.

24. The bearing assembly of claim 23, wherein each of said inner pads and said outer pads comprises a first rounded portion and a second rounded portion.

25. The bearing assembly of claim 24, wherein each of said first rounded portion and said second rounded portion is feathered to said hoop internal surface or to said hoop external surface.

26. The bearing assembly of claim 23, wherein each of said inner pads is disposed against said outer raceway outer surface.

27. The bearing assembly of claim 23, wherein each of said outer pads is disposed against said housing inner surface.

28. An apparatus, comprising:
a rotor;
a rolling element bearing for supporting said rotor, said bearing comprising an outer raceway;
a housing for said bearing; and
a composite resilient mount disposed external to said outer raceway, wherein said composite resilient mount comprises:
a hoop portion having a hoop internal surface and a hoop external surface,
a plurality of inner pads dispersed circumferentially on said hoop internal surface of said composite resilient mount, and
a plurality of outer pads dispersed circumferentially on said hoop external surface of said composite resilient mount, wherein said composite resilient mount comprises a composite material, and said composite material comprises circumferentially wound fibers and a resin.

29. The apparatus of claim 28, wherein said bearing is a ball bearing or a roller bearing.

30. The apparatus of claim 28, wherein said circumferentially wound fibers comprise carbon fiber, and said resin comprises polyimide or polyetheretherketone.

31. The apparatus of claim 28, wherein:
each of said outer pads is interspersed between an adjacent pair of said inner pads to define a plurality of arcuate beam portions circumferentially disposed between said inner pads and said outer pads, and
each of said outer pads is located equidistant between an adjacent pair of said inner pads.

32. The apparatus of claim 28, wherein each of said inner pads and said outer pads include peripheral pad rounded portions.

33. The apparatus of claim 28, wherein:
each of said inner pads is adapted for contacting an outer surface of said outer raceway, and
each of said outer pads is adapted for contacting an inner surface of said housing.

34. The apparatus of claim 28, wherein said composite material comprises a plurality of circumferentially arranged layers, each of said layers comprising a continuous length of said circumferentially wound fibers.

35. The apparatus of claim 28, wherein said apparatus is selected from the group consisting of a turbomachine, a generator, a motor, and a compressor.

* * * * *